United States Patent Office 2,694,064
Patented Nov. 9, 1954

2,694,064

TRIAZINE OPTICAL BRIGHTENING AGENTS

Heinrich Hausermann, Basel, Switzerland, assignor to J. R. Geigy A. G., Basel, Switzerland, a Swiss firm No Drawing. Application May 1, 1950, Serial No. 159,396

Claims priority, application Switzerland May 31, 1949

5 Claims. (Cl. 260—249.6)

The present invention is concerned with the manufacture of optical brightening agents and the brightening agents themselves, i. e., practically colourless to faintly yellow coloured substances which, when present in very small quantities on a more or less white substratum fluoresce violet-blue to green-blue in ultraviolet light and in daylight, in which they are affected by the ultraviolet component. In this way, they have an optical brightening effect on the substratum. In particular, the invention is concerned with an improvement in the manufacture of optical brightening agents derived from 4.4'-diaminostilbene-2.2'-disulphonic acid by unsymmetrical substitution of the two amino groups of the latter compound, on the one hand with a 1.3.5-triazinyl radical and on the other hand with an acyl radical which has a particularly favourable effect on the optical properties of the final product.

It has been known for a considerable time that derivatives of 4.4'-diaminostilbene-2.2'-disulphonic acid whose amino groups are substituted either by two triazinyl radicals or by two benzoyl radicals act as optical brightening agents because of their fluorescence in daylight on more or less white substrata. Their brightening effect is due to the compensation of the yellowish self-colour of incompletely white substrata by their more or less pure blue radiation. So that the effect may be as complete as possible, giving the purest possible white appearance, the active substance should emit a very pure blue fluorescence. An optical brightening agent only comes up to modern requirements when it complies to a large extent with this condition.

However, the usual acyl derivatives of 4.4'-diaminostilbene-2.2'-disulphonic acid, for example, the dibenzoyl derivative, emit in general a fluorescent light which is much too weak and too reddish, while the di-(1.3.5-triazinyl)-compounds, although fluorescing blue at low concentrations, have properties which are undesirable for certain applications. In particular, their affinity to cellulose fibres is too pronounced. Consequently, they accumulate to such an extent on these fibres after repeated treatment with washing or rinsing liquors containing such di-triazinylaminostilbene-2.2'-disulphonic acids as additives that the material treated soon shows a much too strong, unpleasantly reddish tinted fluorescence.

Attempts have therefore been made to decrease the substantivity of the ditriazinyl compounds by using combinations, where the amino groups of 4.4'-diaminostilbene-2.2'-disulphonic acid are substituted on the one hand by a triazinyl radical and on the other hand by an acyl radical. However, it is very difficult to find an acyl radical which is more or less equivalent to the triazinyl radical, in bringing about a fluorescence of equal intensity, producing a fluorescent light of as pure a blue as possible and in being at the same time very fast to light. The simple benzoyl radical is out of the question because of its limited fluorescent properties and because of the reddish shade produced. So far all other acyl radicals suggested have been unsatisfactory because of the too reddish shade produced. Furthermore, benzoyl radicals substituted in the 4-position of the benzene ring which are known to induce good fluorescent properties have unfortunately such poor fastness to light that they are no good for practical use. In addition, they do not reduce the substantivity of the stilbene compound.

It has now been found that certain quite specific substituted benzoyl radicals derived from carboxylic acids of the benzene series which are cheap and readily available technically are very suitable for use together with 1.3.5-triazinyl radicals in the manufacture of unsymmetrically substituted 4.4'-diaminostilbene-2.2'-disulphonic acids, because of the production of an intense blue fluorescence, which is fast to light. Such compounds form optical brightening agents excellently suited for cellulose fibres. They have a somewhat more greenish tinted blue fluorescence than that of the symmetrically substituted dibenzoyl derivatives and less affinity to cellulose fibres than the di-triazinyl derivatives. The benzoyl radicals according to the invention contain a substituted or unsubstituted lower molecular alkoxy group in o-position to the carbonyl group and may be substituted, if desired, in any position of the benzene ring by a methyl group, which causes a particularly strong fluorescence when in p-position to the carbonyl group, so that unsymmetrically substituted stilbene derivatives containing the 4-methyl-2-alkoxy benzoyl radical according to the invention may be regarded as the most valuable class of optical brightening agents obtainable by the present process.

These optical brightening agents are obtained by treating a 4.4'-diaminostilbene-2.2'-disulphonic acid monosubstituted in one amino group by either a 1.3.5-triazinyl radical or a 2-alkoxy- or 2-acyloxy benzoyl radical which may be methyl substituted, with a reactive compound containing the other of the two radicals named above until the primary amino group disappears. The acyloxy group may, if required, then be saponified to the hydroxyl group under mild conditions and the hydroxy group next alkylated so as to produce compounds of the general formula:

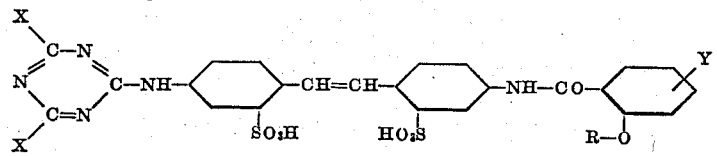

wherein X stands for halogen, a hydroxyl group or, preferably, an amine radical,
Y stands for hydrogen or a methyl group and
R stands for a substituted or unsubstituted lower molecular alkyl radical.

The most valuable class with respect to the benzoyl radical is, as already emphasized, that consisting of the 4-methyl-2-alkoxybenzoyl compounds. Further, with respect to the alkyl radical in the alkoxy group, the best results are given by compounds containing a methoxy, an ethoxy or a β-hydroxyethoxy group since these groups increase the intensity of fluorescence still further and are also easy to introduce.

The monosubstitution products of 4.4'-diaminostilbene-2.2'-disulphonic acid employed in the invention are obtained from 4-nitro-4'-aminostilbene-2.2'-disulphonic acid, which is readily available technically, by substituting the primary amine group with the radical of a reactive 1.3.5-triazinyl compound or a benzoyl compound substituted according to the invention and then reducing the nitro group to a primary amino group.

The halides of 1.3.5-triazinyl compounds are suitable for use in this process, especially cyanuric chloride which may be used as such or also in the form of derivatives already partly substituted by amino radicals, e. g., as an alkali salt of the product of the reaction with metanilic acid in aqueous solution. The remaining halogen atoms may then be replaced as required, at some suitable stage in the series of reactions leading to the final product, either by the hydroxy group (using alkali) or by amino radicals (using ammonia or primary and secondary amines of the aliphatic or benzene series). Compounds according to the invention, wherein X means a primary amino group or an amino group substituted by lower aliphatic groups or more especially by lower aliphatic, hydroxyl containing groups, are particularly suitable because of their favourable solubility. If desired, hydroxymethyl groups may be introduced into the primary amino groups of the 1.3.5-triazinyl radical afterwards, according to the process described in British Patent No. 595,065.

As far as they are available, benzoyl halides may be used to introduce the substituted benzoyl radicals according to the invention. However, 2-(hydroxy-alkoxy)-benzoyl halides which may be substituted by methyl in the benzene ring cannot be prepared from the corresponding carboxylic acids by treatment with halogenating agents such as thionyl chloride or phosphorus halides because in this case the aliphatically bound hydroxyl group would also be replaced by halogen and could not be easily reconverted to hydroxyl in the final products of the reaction. Consequently another process must be used. This process consists in reacting aminostilbene derivatives suitable for use in the invention first with 2-acyloxybenzoyl halides, e. g. acetyl-salicylic acid chloride or acetyl cresotic acid chloride, and then submitting the acyloxy groups to mild saponification at some suitable stage in the process of manufacture. This does not cause the slightest change in the benzoylamino linkage, and the freed hydroxyl groups may then be alkylated, e. g. with glycol chlorohydrin or with glycerol chlorohydrin. The same process is also very well suited for the production of non-hydroxy-alkyl substituted compounds, e. g. if the hydroxyl groups are alkylated with dimethyl or diethyl sulphate.

The aminostilbene sulphonic acids, suitable for use in the invention may very suitably be reacted in heterogeneous phase with the reactive substituted derivatives of benzoic acid according to the invention or the reactive triazinyl compounds, using the aqueous solutions of the alkali salts of the first named compounds at lower, ordinary or slightly raised temperatures in the presence of agents weakening mineral acids, such as sodium acetate, or of acid binding agents, such as sodium carbonate, magnesium oxide, magnesium or calcium carbonate, and of inert organic solvents, nonmiscible with water, for the benzoyl halides, such as benzene toluene, chlorobenzene, nitrobenzene, while stirring well. However, water miscible organic solvents for the reactive derivatives used in the invention may also be added, e. g., acetone, as usual in reactions employing cyanuric chloride. Such solvents act as solution-promoters.

The 4-(2''-alkoxybenzoyl- or alkoxymethyl benzoylamino) - 4' - triazinylaminostilbene - 2.2' - disulphonic acids according to the invention are, when in the form of their alkali salts, more or less strongly yellow coloured powders, which dissolve in water, particularly readily on warming, to give practically colourless solutions. Even very small amounts produce a very fine optical brightening effect on more or less white cellulose.

The following examples illustrate the invention without limiting it. Parts are by weight and temperatures are in degrees centigrade.

*Example 1*

40 parts of 4-nitro-4'-aminostilbene-2.2'-disulphonic acid are dissolved in 800 parts of water with the addition of 10.6 parts of soda ash and after adding 27.2 parts of crystalline sodium acetate are vigorously stirred for 10 hours at 0–5° with a solution of 42.5 parts of 2-acetoxy-4-methylbenzoyl chloride in 150 parts of benzene. After neutralising with 15% sodium carbonate solution until the mixture is neutral to litmus, it is heated to 80–90° and sufficient sodium carbonate is added at this temperature to make the reaction mixture alkaline to phenolphthalein. The benzene is distilled off and after adding 60 parts of common salt the aqueous suspension is allowed to cool. The disodium salt of 4-nitro-4'-(2''-hydroxy - 4'' - methylbenzoylamino) - stilbene - 2.2' - disulphonic acid is then filtered off and after drying is an orange-yellow powder which dissolves well in water.

57.8 parts of the sodium salt of 4-nitro-4'-(2''-hydroxy-4'' - methylbenzoylamino) - stilbene - 2.2' - disulphonic acid are dissolved in 600 parts of water containing 4 parts of 100% NaOH and then 15.4 parts of diethyl sulphate are added at 55–65° and the mixture vigorously stirred. Stirring is continued at 55–65° until the mixture is neutral or only very faintly alkaline to phenolphthalein. Caustic soda solution is added until the mixture is distinctly alkaline, it is allowed to cool, and the reaction product is then filtered off in the form of a yellow crystalline mass. The disodium salt of 4-nitro-4'-(2''-ethoxy-4''-methylbenzoylamino)-stilbene-2.2'-disulphonic acid obtained in this way is reduced to the 4-amino-4'(2''-ethoxy-4''-methylbenzoylamino)-stilbene-2.2'-disulphonic acid in the usual way by the Béchamp method with iron powder and acetic or hydrochloric acid. It is a faintly yellowish to reddish powder which dissolves in water, with the addition of alkalis, to give a clear solution.

26.6 parts of 4-amino-4'-(2''-ethoxy-4''-methylbenzoylamino)stilbene-2.2'-disulphonic acid are dissolved in 800 parts of water and 5.3 parts of soda ash, giving a neutral solution, and an acetone solution of 9.2 parts of cyanuric chloride is added at —2 to 0° while stirring well, the reaction mixture being maintained neutral to weakly acid by simultaneous addition of 15% sodium carbonate solution. While maintaining the reaction mixture neutral with sodium carbonate, it is stirred until no more primary amino groups can be detected (diazo reaction). In the event of a diazo reaction still occurring after prolonged stirring a further small quantity of cyanuric chloride is added until the amino groups disappear. The primary condensation product obtained in this way is now mixed with excess aqueous ammonia and heated to 90–100°, whereupon the acetone distills off and is recovered. The mixture is held distinctly alkaline to phenolphthalein for 1½ hours at 90–100° by adding ammonia, filtered hot and salted out with 100 parts of common salt. The disodium salt of 4-[2'''.4'''-diaminotriazinylamino - (6''')] - 4' - (2'' - ethoxy - 4'' - methylbenzoylamino) - stilbene - 2.2' - disulphonic acid thus obtained is a yellowish powder readily soluble in water and having affinity for cellulose. The dyeings on cellulose fibres fluoresce a very intense blue to blue-green in ultraviolet light and in daylight. Thanks to this colouristic property the new compound is excellently suited for brightening cellulose fibre products of every kind.

Properties quite similar to the above are possessed by compounds prepared when the primary condensation product from 4-amino-4'-(2''-ethoxy-4''-methylbenzoylamino)-stilbene-2.2'-disulphonic acid and cyanuric chloride is reacted with an excess of a primary or secondary amine instead of with ammonia, e. g. with methylamine, ethylamine, monoethanolamine, diethanolamine, aminopropane-diol and the like.

*Example 2*

40 parts of 4-nitro-4'-aminostilbene-2.2'-disulphonic acid are dissolved in 800 parts of water with the addition of 10.6 parts of soda ash and acylated at 0–5° with a 20% solution of 2-methoxy-4-methylbenzoyl chloride in acetone with the addition of sodium carbonate (acid to litmus to weakly alkaline to brilliant yellow) until a test sample no longer gives the diazo reaction. The disodium salt of 4-nitro-4'-(2''-methoxy-4''-methylbenzoylamino)-stilbene-2.2'-disulphonic acid thus obtained is salted out by adding 100 parts of common salt and directly reduced by the Béchamp method to 4-amino-4' - (2'' - methoxy - 4'' - methylbenzoylamino) - stilbene-2.2'-disulphonic acid.

A solution of 25.9 parts of 4-amino-4'-(2''-methoxy-4'' - methylbenzoylamino) - stilbene - 2.2' - disulphonic acid and 5.3 parts of soda ash in 800 parts of water is added at 0° while stirring to a suspension of 9.25 parts of cyanuric chloride in 400 parts of water. The hydrochloric acid set free is neutralised by the gradual addition of sodium carbonate. The primary condensation product thus obtained is not isolated but mixed directly with a solution of 6.5 parts of aniline hydrochloride in 20 parts of water and then maintained weakly acid to litmus at 10–20° by adding sodium carbonate until no more aniline can be detected. The final replaceable chlorine atom in this secondary condensation product is replaced by the β-hydroxyethylamino group in the usual manner by the addition of 6.1 parts of monoethanolamine at 90–100°. The hot solution is filtered and the reaction product is salted out by the addition of 100 parts of common salt. After drying, the new compound, the disodium salt of 4-[2'''-anilino-4'''-(β-hydroxyethylamino) - triazinylamino - (6''')] - 4' - (2'' - methoxy-4''-methylbenzoylamino)-stilbene-2.2'-disulphonic acid, is a light yellow powder which is soluble in water. The aqueous solution is excellently suited for giving a pure white appearance to yellowish undyed cellulose fibre products. The fluorescent shade of this product is also blue to bluish-green, but the strength is somewhat less than that of the products described in Example 1. If in this example the aniline hydrochloride is replaced by 7.17 parts of N-methylaniline hydrochloride or 7.17 parts of toluidine hydrochloride then products with quite similar properties are obtained.

*Example 3*

57.8 parts of 4-nitro-4'-(2''-hydroxy-4'''-methylbenzoylamino)-stilbene-2.2'-disulphonic acid (sodium salt), obtained as in Example 1, are dissolved in 600 parts of water, 4 parts of NaOH (100%) are added, and while stirring, 8.05 parts of ethylene chlorohydrin are added dropwise at 60–70°. Stirring is continued at 60–70° until the mixture reacts neutral or only faintly alkaline to phenolphthalein, caustic soda solution is then added until the reaction is distinctly alkaline and the product is salted out with 100 parts of common salt. The disodium salt of 4-nitro-4'-(2''-β-hydroxyethoxy-4'''-methylbenzoylamino)-stilbene-2.2'-disulphonic acid thus obtained is reduced in the usual way by the Béchamp method to 4-amino-4'-(2''-β-hydroxyethoxy-4'''-methylbenzoylamino)-stilbene-2.2'-disulphonic acid. The latter is condensed with cyanuric chloride and ammonia as described in Example 1. The product thus obtained is the disodium salt of 4-[2'''.4'''-diaminotriazinylamino-(6''')]-4'-(2''-β-hydroxyethoxy-4'''-methylbenzoylamino)-stilbene-2.2'-disulphonic acid. It is a yellowish powder readily soluble in water, having colouristic properties similar ot those of the compounds prepared according to Example 1.

In this example too, the replacement of ammonia by primary or secondary amines such as e. g., methylamine, ethylamine, diethanolamine gives quite similar products.

*Example 4*

40 parts of 4-nitro-4'-aminostilbene-2.2'-disulphonic acid are dissolved in 800 parts of water, containing 10.6 parts of soda ash and stirred well at 0° with 18.5 parts of pulverised cyanuric chloride, the mixture being maintained weakly acid to Congo red by the addition of sodium carbonate. As soon as no further diazo reaction is obtained, the reaction mixture is made neutral to litmus with sodium carbonate, and reacted first at 20–25° with 17.3 parts of metanilic acid and then at 90–95° with 9.3 parts of aniline in the presence of 15 parts of crystalline sodium acetate. The reaction product is reduced with iron and hydrochloric acid by the Béchamp method and the amino compound obtained acylated in the usual manner with acetyl-o-cresotic acid chloride and sodium carbonate at 5–10° until no more primary amino groups can be detected. The acetyl group is now saponified with sodium carbonate at 80–90° until the reaction remains alkaline to phenolphthalein and ethylated at 60–70° with 15.4 parts of diethyl sulphate and 4 parts of 100% caustic soda solution. The final product is salted out and after drying, it is a light yellow powder, which is very suitable, thanks to its fluorescent properties and good affinity for cellulose, for brightening white textile goods. The action of this product as a brightening agent is, however, distinctly weaker than that of the compounds obtained according to Examples 1–3.

A brightening agent with similar properties can be obtained, if the acetyl-o-cresotic acid chloride in the above example is replaced by acetyl-p-cresotic acid chloride. A considerably more active product is obtained, however, if acetyl-m-cresotic acid chloride is used insteod of acetyl-o-cresotic acid chloride.

*Example 5*

51.8 parts of 4-amino-4'-(2''-ethoxybenzoylamino)-stilbene-2.2'-disulphonic acid, which can be obtained, e. g., from 4-nitro-4'-aminostilbene-2.2'-disulphonic acid by acylation with 2-ethoxybenzoyl chloride and reduction by the Béchamp method, are dissolved in 1000 parts of water containing 10.6 parts of soda ash and treated at 0° with 18.5 parts of cyanuric chloride by the method described in Example 1. The primary condensation product obtained is further condensed with ammonia, also as described in Example 1, and the reaction product salted out. The disodium salt of 4-[2'''.4'''-diaminotriazinylamino-(6''')]-4'-(2''-ethoxybenzoylamino)-stilbene-2.2'-disulphonic acid produced is a faintly yellowish powder suitable for brightening undyed cellulose fibres. As regards the strength of fluorescence this product is considerably behind those of Examples 1–3.

*Example 6*

If in Example 2, the 2-methoxy-4-methylbenzoyl chloride is replaced by an equivalent amount of 2-isobutoxy-4-methylbenzoyl chloride, the product is the disodium salt of 4-[2'''-anilino-4'''-(β-hydroxyethylaminotriazinylamino-(6''')]-4'-(2''-isobutoxy-4'''-methylbenzoylamino)-stilbene-2.2'-disulphonic acid. The alkali salts of this compound are somewhat less soluble in water. However, the product is an excellent brightening agent for white textile goods because of its intense fluorescence and good affinity for textile fibres.

*Example 7*

A piece of white cotton poplin is dyed with 0.02% of the stilbene derivative obtained in Example 1 in the presence of 5% Glauber's salt for 15 minutes at 40° in a dyebath, liquor ratio 1:50. After rinsing and drying, the treated material appears considerably whiter than the untreated goods.

*Example 8*

1 part of white textile goods, such as, e. g., pillow-cases, sheets etc. are treated in 10 parts of a wash liquor containing 3 g. of curd soap, 2 g. of sodium carbonate and 0.001 g. of the brightening agent, obtained as in Example 2, per litre. After washing at 90–100°, followed by rinsing and drying in the normal manner, a gleaming white wash is obtained, which does not show any unpleasant red tinge.

What I claim is:

1. An optical brightening agent selected from the group consisting of a disulphonic acid corresponding to the formula:

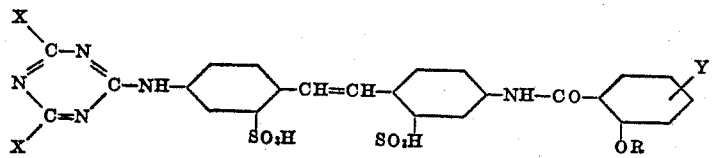

wherein X represents the nitrogen-bound radical of a compound selected from the group consisting of ammonia and primary and secondary amines of the aliphatic and benzene series, Y represents a member selected from the group consisting of H and $CH_3$, and R represents a member selected from the group consisting of lower alkyl and lower hydroxyalkyl radicals and the alkali salts thereof.

2. An optical brightening agent corresponding to the formula:

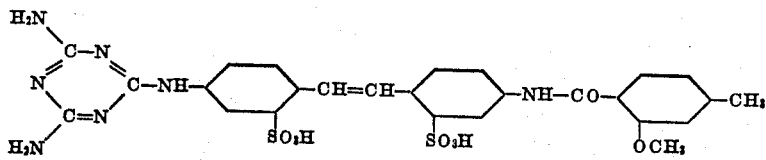

3. An optical brightening agent corresponding to the formula:
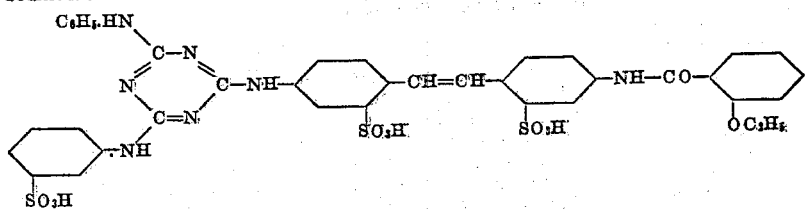
4. An optical brightening agent corresponding to the formula:
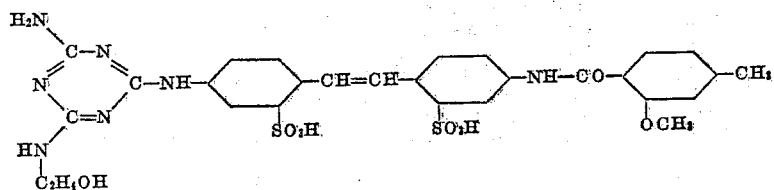
5. An optical brightening agent corresponding to the formula:
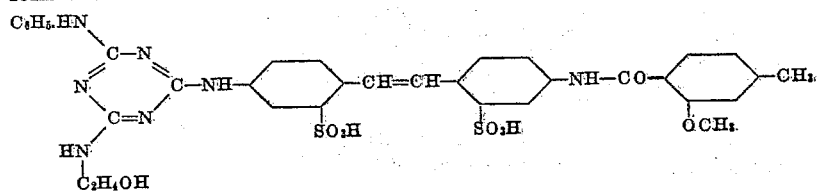
No references cited.